Jan. 23, 1951  J. S. HERSON  2,538,781
RADIANT ENERGY CONTROL DEVICE
Filed July 16, 1945  2 Sheets-Sheet 1

INVENTOR.
JACOB S. HERSON
BY
ATTORNEYS

Jan. 23, 1951 J. S. HERSON 2,538,781
RADIANT ENERGY CONTROL DEVICE
Filed July 16, 1945 2 Sheets-Sheet 2

INVENTOR.
JACOB S. HERSON
BY
ATTORNEYS

Patented Jan. 23, 1951

2,538,781

UNITED STATES PATENT OFFICE 2,538,781

RADIANT ENERGY CONTROL DEVICE

Jacob S. Herson, Dayton, Ohio

Application July 16, 1945, Serial No. 605,450

2 Claims. (Cl. 250—1)

(Granted under the act of March 3, 1883, as amended April 30, 1928; 370 O. G. 757)

The invention described herein may be manufactured and used by or for the Government for governmental purposes without payment to me of any royalty thereon.

The present invention relates to radiant energy control devices of the thermo-pneumatic type.

The fundamental receiving unit is fully described in the patent to Hall, No. 2,115,578, granted April 26, 1938 and further reference thereto in the description of this invention will be made solely to facilitate such description. The fundamental unit, hereinafter referred to as "cell," comprises a chamber enclosing a body of dark heat-absorbing substance which is sensitive to radiant energy over a wide band of frequencies, together with a member such as a diaphragm which is influenced by the pressure changes induced by the radiant energy absorbed by the dark substance. In the "cell" utilized with this invention, the radiant energy causes a displacement of one flexible electrode with respect to a second fixed electrode, both electrodes being of metallic or metalized substance and separated by air or gas dielectric. The separation of the two electrodes by the dielectric effectively constitutes a condenser whose capacitance varies under the influence of incident radiated energy.

The patent to Hall relates to use of the "cell" as a receiver for detection of bodies which are of a different temperature from their surroundings, measurement of radiation from a distant emitter such as an aircraft or other metallic substance and as a signalling device. The novel features of this invention is the provision of a system whereby the overall sensitivity is increased by conversion of the radiant energy into audible and visible signals, and whereby the relative direction of the arrival of the radiated energy is indicated.

It is, therefore, an object of this invention to provide circuit means whereby the variation of the capacitance of the "cell" is converted into audible signals.

Another object is to provide circuit means for the conversion of the radiated energy into visible signals.

A further object is to provide circuit means for indicating the relative direction of the arrival of the radiated energy.

A still further object is to provide in a radiant energy signal deriving system the method of converting received radiant energy into signal indicating energy to actuate signal indicators.

Other objects and features of novelty will be apparent from the following description and the annexed drawings, it being clearly understood, however, that the invention is not limited in any way by such description and drawings or otherwise than by the appended claims.

Referring to the drawings in which similar reference numerals refer to like parts, Fig. 1 is a block diagram illustrating the interconnection of the components of one form of this invention with the radiant energy receiving "cell";

Figure 1:
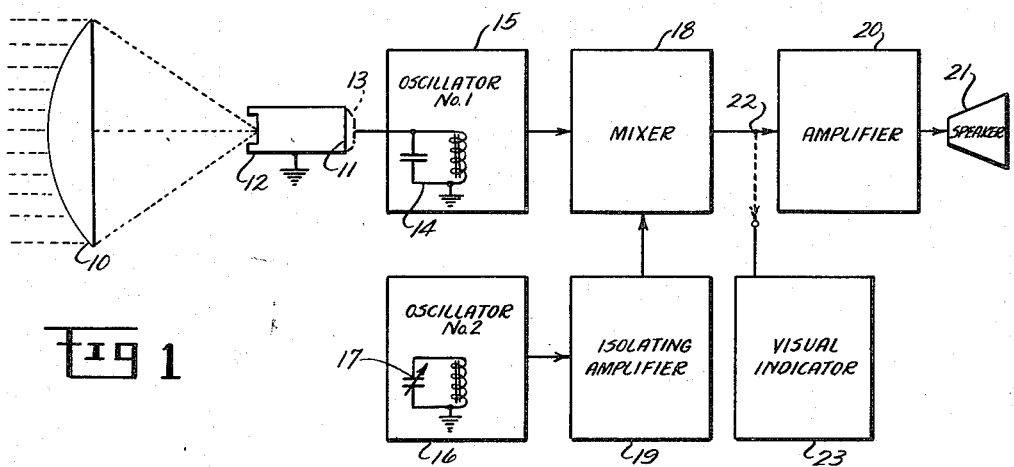

Referring now to Fig. 1 of the drawings, radiated energy from any distant source incident upon lens 10 which is transparent to the received radiation, is concentrated on the black body contained in "cell" 12 causing a displacement of the metalized membrane 11 with respect to flat metal plate 13 thus varying the capacitance formed by the proximity of metalized membrane 11 to metal plate 13, with air as the dielectric. This effected capacitor is connected to tank circuit 14 and forms a part thereof to determine the frequency of oscillation of radiofrequency varying oscillator 15. Radio-frequency fixed oscillator 16 is adjusted by means of variable capacitor 17 to zero beat with radiofrequency oscillator 15 in the absence of any incoming radiant energy. The output of oscillator 15 is fed directly to mixer stage 18 and the output of oscillator 16 is fed through isolating amplifier stage 19 to mixer stage 18 to derive the difference frequency which is audible, isolating amplifier 19 being utilized to prevent interaction (locking) by oscillator 15 with oscillator 16. The output of mixer stage 18 is fed to and amplified by audio amplifier 20. The audio output from amplifier 20 is made audible by loud speaker 21. Single-pole-double-throw switch 22 is employed to switch the output from mixed 18 to visual indicator 23 if visual indication of the presence of radiated energy from any source within the field of lens 10 and cell 12 is desired.

The operation is as follows: With the radiant energy receiving "cell" in a quiescent state, the fixed oscillator is adjusted to zero beat with the radio-frequency varying oscillator. Radiation from any target within the range of this device causes a change of capacitance in the "cell" and therefore a change of frequency of the radio-frequency varying oscillator, thus producing a beat note in the mixer stage of a frequency equal to the difference between the frequencies of the radio-frequency varying oscillator and the fixed oscillator. The output from the mixer is made audible by means of a loud speaker or earphones.

Figure 2:
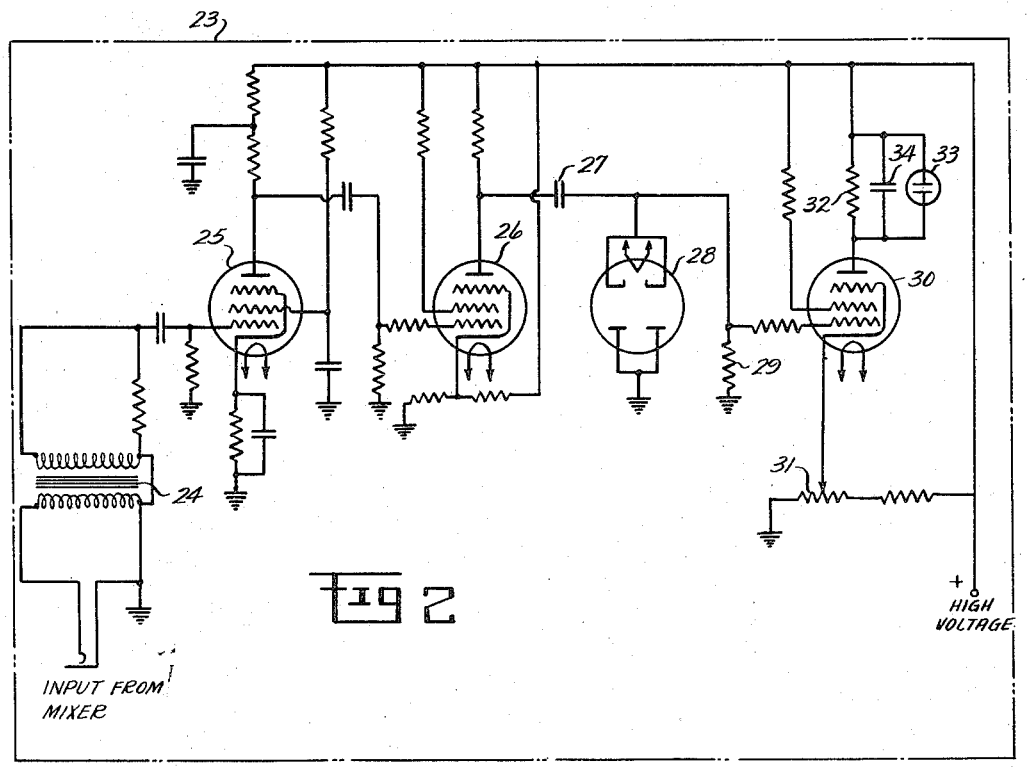
Fig. 2 is a schematic diagram of one form of the visual indicator portion of this invention.

Referring now to Fig. 2 of the drawings, when radiated energy has, as previously described, been received, and switch 22 is thrown to visual indicator position, the output circuit of the mixer stage is inductively coupled through transformer 24 to the control grid of amplifier tube 25. The output circuit of this tube is then capacitively coupled to the control grid of pentode frequency counting tube 26. Condenser 27 is normally charged to the value of the high voltage plate supply since tube 26 is biased to cut-off. Tube 26 conducts only during the positive half cycle of the input signal, during which time, tube 26 presents a discharge path for condenser 27. During the negative half cycle of the input signal, condenser 27 charges again, the charge and discharge cycle being repeated every cycle of the incoming signal. Diode tube 28 is placed in parallel with resistor 29 to separate the charge pulses from the discharge pulses generated by condenser 27 by providing a path for the discharge pulses which path is of lower impedance than resistor 29. The charge pulses develop a voltage across resistor 29 which is applied to the control grid of pentode amplifier tube 30. The grid bias of amplifier tube 30 with no input signal is adjusted by variable resistor 31 to keep the plate current of tube 30 and the voltage drop across resistor 32 below the required voltage for firing neon tube 33. In the presence of an input signal on the grid of tube 30, the plate current rises during each positive half cycle sufficiently to raise the voltage drop across resistor 32 above the firing point of neon tube 33 so that condenser 34 which is in parallel with and charged to the same voltage as the voltage across resistor 32 causes neon tube 33 to fire and form a discharge path for condenser 34, thus providing visual indication of the presence of a radiating body. The rate of charge and discharge of condenser 34 is determined by the constants of the circuit elements associated with the plate circuit of tube 30.

Figure 3:
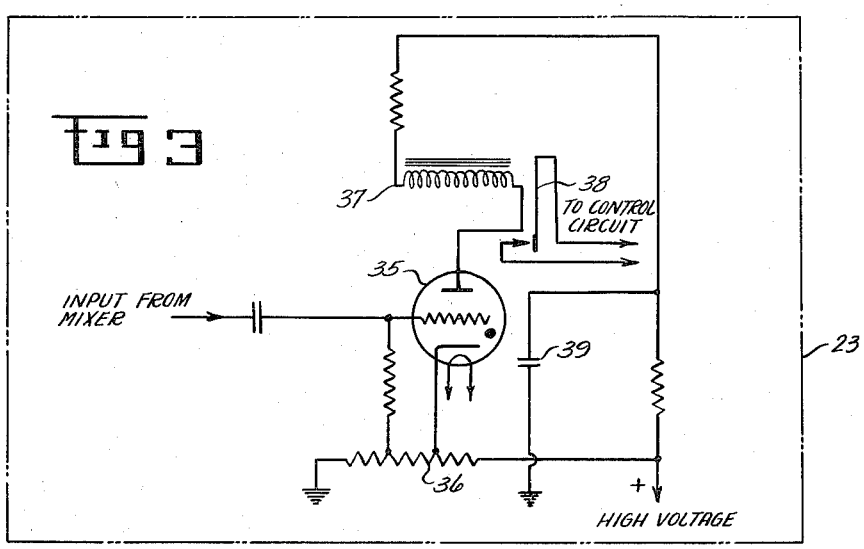
Fig. 3 is a schematic diagram of an alternate form of the visual indicator portion of this invention.

Another form of visual indicator than the one illustrated in Fig. 2 is shown in Fig. 3 of the drawings. Referring now to Fig. 3 of the drawings the input signal from mixer 18 (shown in Fig. 1) is capacitively coupled to the control grid of gas tube 35. The grid and cathode electrodes of gas tube 35 are so connected to bleeder resistor 36 that the grid is sufficiently negative with respect to the cathode to maintain tube 35 normally non-conducting. In the presence of a signal, the output of mixer 18 raises the grid voltage of tube 35 during the first positive half-cycle of the input signal causing tube 35 to conduct. Condenser 39 is connected between ground and the high voltage supply and is normally maintained in a charged condition by the high voltage supply. When tube 35 is triggered into conductance by the incoming signal, condenser 39 is discharged through the path formed by said tube 35 thereby maintaining a high voltage on the plate of said tube 35. The discharge of condenser 39 serves to maintain relay coil 37 in an energized condition for a predetermined period of time after the beginning of the conducting period of tube 35, depending on the value of condenser 39. The closing of relay circuit 38 causes a signal lamp to light, rings a bell or operates any desired auxiliary control circuit. After condenser 39 is fully discharged, tube 35 ceases to conduct and condenser 39 is immediately charged up until the next incoming positive half cycle of the signal from mixer 18 causes tube 35 to conduct again and the cycle is repeated.

Figure 4:
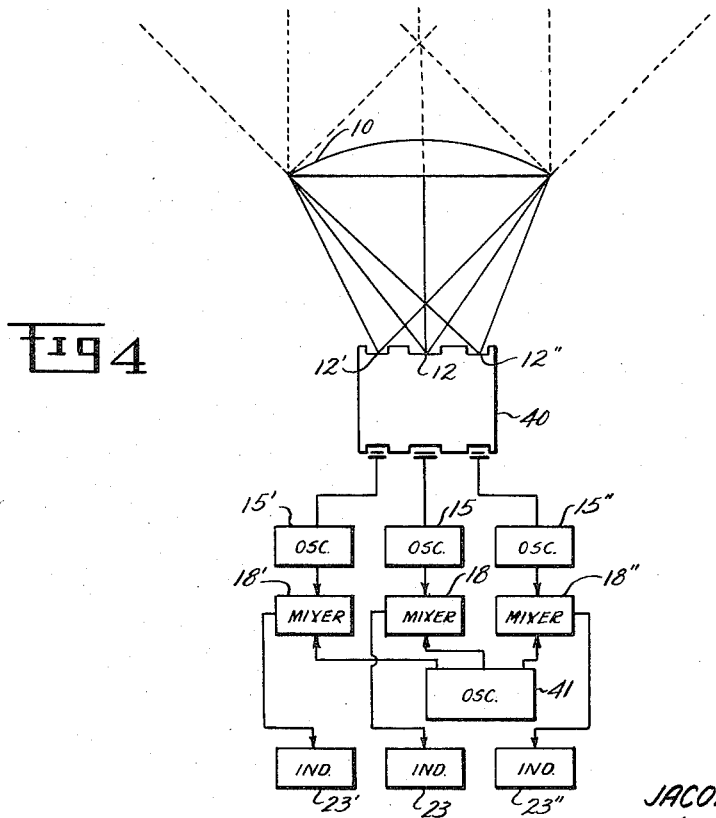
Fig. 4 is a block diagram illustrating a multiple channel arrangement of the components of this invention for indicating the relative direction of arrival of radiated energy.

The scope of this invention may be extended to indicate the relative direction of arrival of radiation. This may be accomplished by employing several parallel detector channels, each channel being structurally similar to the detector illustrated in Fig. 1. One form of such an arrangement of detector channels is illustrated by Fig. 4. Referring now to Fig. 4 of this invention, the reference numeral 10 represents a condensing lens. An assembly 40 is made in one structure of the equivalent of three single "cells" 12, 12' and 12", respectively, a single "cell" 12 being used as illustrated in Fig. 1. Radiation from a target located on the axis of lens 10 is concentrated on middle "cell" 12 of assembly 40, and radiations from targets located to the right or to the left of the axis of lens 10 are concentrated on "cells" 12' and 12", respectively. Three separate circuit channels consisting of oscillators 15, 15' and 15" are employed which feed directly to mixer stages 18, 18' and 18" each similar to mixer stage 18, illustrated in Fig. 1. However, a common fixed oscillator 41 is employed instead of three separate fixed oscillators, shown in Fig. 1, its output being fed to mixers 18, 18' and 18" to zero beat with each of radio-frequency varying oscillators 15, 15' and 15" to derive a difference frequency to be fed to one of indicators 23, 23' and 23" depending on whether the source of radiated energy is directly ahead, to the right or to the left of lens 10, thus indicating the relative direction of arrival of radiation. It is clear that the number of circuit channels can be increased if desirable. For example, two more channels may be added to indicate targets above and below the axis of lens 10, if this invention is used in aircraft.

This type of multiple channel detector may be used for automatically steering an aircraft or "robot" in such a manner as to "home" on the source of radiation.

Having thus described my invention, I claim:

1. In a radiant energy detecting device employing detecting cells of the type in which radiant energy received by the cell causes a capacity change, a plurality of such cells arranged along one or more axes, means for concentrating received radiant energy on certain of said cells depending on the direction of the source of radiant energy from the detecting device, a variable frequency oscillator associated with each cell, means utilizing the capacity changes produced by the cells to control the frequencies of said oscillators, a beat frequency oscillator, means associated with the output circuit of each of said variable oscillators for combining its frequency with that of said beat frequency oscillator to produce a difference frequency, and means for indicating the presence of the various difference frequencies.

2. In an arrangement for determining the presence of and direction to a source of radiant energy, a plurality of radiant energy receiving elements of the type containing a capacitive device and means for varying the capacity of said capacitive device in accordance with variations in the intensity of received radiant energy, radiant energy collecting and focussing means, means positioning said receiving elements along an axis in or near to the focal plane of said collecting and focussing means whereby received radiant energy is concentrated at a point along said axis determined by the direction of the received radiant energy, an individual variable frequency oscillator for each of said receiving elements, each of said variable frequency oscillator circuits containing as a frequency varying element the capacitive device of its associated receiving element whereby the frequency of each variable frequency oscillator is determined by the intensity of the radiant energy received by its associated receiving element, a mixer circuit individual to each variable frequency oscillator, a fixed frequency oscillator, means for applying the output of each variable frequency oscillator to its associated mixer circuit and for applying the output of said fixed frequency oscillator to each of said mixer circuits whereby a difference frequency appears in the output of each of said mixer circuits upon receipt of radiant energy by the corresponding receiving element, and means connected to the output of each mixer circuit to indicate the presence of a difference frequency.

JACOB S. HERSON.

REFERENCES CITED

The following references are of record in the file of this patent:

UNITED STATES PATENTS

| Number | Name | Date |
|---|---|---|
| 1,954,204 | Hayes | Apr. 10, 1934 |
| 2,018,080 | Martienssen | Oct. 22, 1935 |
| 2,115,578 | Hall | Apr. 26, 1938 |
| 2,170,487 | Soler | Aug. 22, 1939 |
| 2,334,085 | Graves et al. | Nov. 9, 1943 |
| 2,416,155 | Chubb | Feb. 18, 1947 |
| 2,424,976 | Golay et al. | Aug. 5, 1947 |

FOREIGN PATENTS

| Number | Country | Date |
|---|---|---|
| 488,882 | Great Britain | July 15, 1938 |